United States Patent [19]

Nozemack et al.

[11] Patent Number: 4,780,446

[45] Date of Patent: Oct. 25, 1988

[54] ALUMINA-SILICA COGEL

[75] Inventors: Richard J. Nozemack, Reisterstown; Joseph F. Porinchak, Silver Spring, both of Md.

[73] Assignee: W. R. Grace & Co., New York, N.Y.

[21] Appl. No.: 697,186

[22] Filed: Feb. 1, 1985

Related U.S. Application Data

[63] Continuation of Ser. No. 430,878, Sep. 30, 1982, abandoned.

[51] Int. Cl.⁴ ............................................. B01J 21/12
[52] U.S. Cl. ..................................... 502/235; 502/234
[58] Field of Search ........................................ 502/235

[56] References Cited

U.S. PATENT DOCUMENTS 2,906,713  9/1959  Hunter et al. ..
3,210,294  10/1965 Chemitz et al. ..
3,355,396  11/1967 Otremba et al. ..
3,393,148  7/1968  Bertolacini et al. ..
3,403,109  9/1968  Colgan et al. ..
3,905,916  9/1975  Rileg et al. ..
4,310,441  11/1982 Alafandi et al. ..

Primary Examiner—William R. Dixon, Jr.
Assistant Examiner—David M. Brunsman
Attorney, Agent, or Firm—Arthur P. Savage

[57] ABSTRACT

A precipitated alumina-silica cogel which possesses a high total pore volume and wide pore size distribution. The precipitated cogel is used to prepare catalysts and catalyst supports that are used in the catalytic conversion and processing of hydrocarbons.

6 Claims, 1 Drawing Sheet

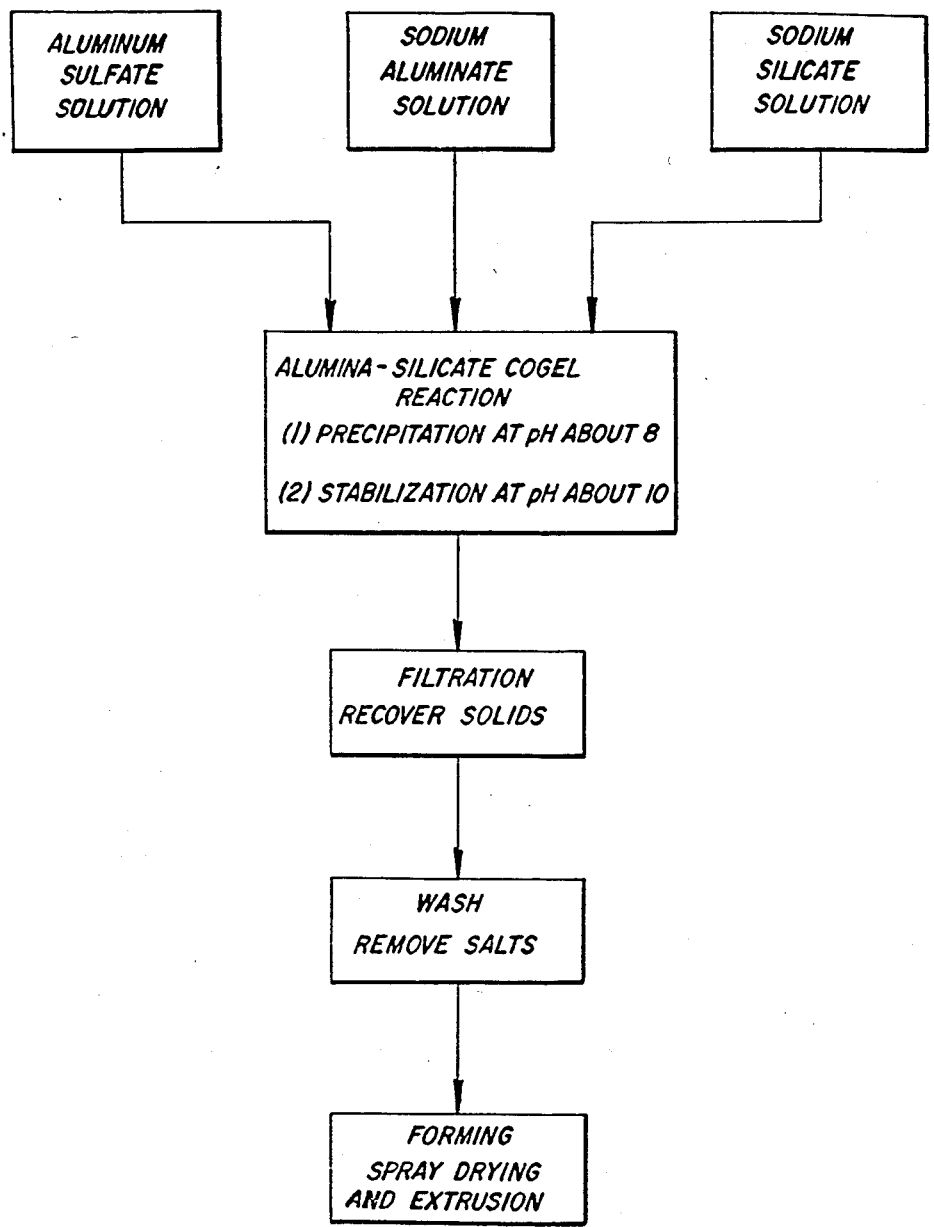

ALUMINA-SILICA COGEL

This is a continuation, of application Ser. No. 430,878, filed Sept. 30, 1982 now abandoned.

The present invention relates to the preparation of inorganic oxide catalyst supports, and more specifically to the preparation of precipitated alumina-silica cogel compositions which possess desirable pore volume and pore size distribution characteristics.

It is generally known that hydrocarbon conversion and processing catalysts which are used in the hydrotreating of hydrocarbons to remove nitrogen, sulfur and metallic impurities must possess a high degree of stability and porosity. Furthermore, it is generally recognized that hydroprocessing catalysts are generally prepared from inorganic oxide supports such as alumina, silica and silica-alumina which possess specified surface area and pore volume as well as pore volume distribution and pore size characteristics.

The prior art discloses the preparation and use of hydroprocessing catalysts which are described in terms of physical and chemical properties that are frequently specifically developed to meet the requirements of particular processes and feedstocks.

U.S. Pat. Nos. 3,393,148, 4,119,531, 4,212,729 and 4,297,242 describe the preparation and use of hydroprocessing catalyst compositions which possess large size pores and high surface area characteristics. The catalysts are particularly effective for hydrodesulfurization, hydrodemetallization of hydrocarbon feedstocks.

U.S. Pat. Nos. 4,257,922 and 4,294,685 describe catalysts and processes used for the hydroconversion of coal solids. The catalysts possess a bimodal distribution which is described in terms of pores of above and below 600 Å with an average pore diameter of the smaller pores being in the range of 100 to 200 Å and of the larger pores being in excess of 1000 Å.

U.S. Pat. Nos. 3,403,111 and 4,154,812 describe methods for preparing precipitated aluminas and silica containing aluminas wherein mixtures of acid and alkali metal aluminum salts are reacted under specific conditions of concentration, pH and temperature. The precipitated aluminas are used to prepare catalyst supports which possess desired pore volume distribution surface area and crush strength characteristics.

While the prior art describes any catalysts which possess the physical characteristics as well as the chemical properties necessery for the processing of hydrocarbons, it is frequently found that preparation of many of these catalysts require the use of expensive starting materials and/or production techniques.

It is therefore an object of the present invention to provide improved inorganic oxide catalysts and catalyst supports.

It is another object to provide alumina-silica catalysts and catalyst support components which may be used in the preparation of a wide variety of hydrocarbon conversion, processing and/or treating catalysts.

It is a further object to provide a method by which precipitated alumina-silica cogels may be prepared from inexpensive materials using readily available commercial production facilities.

These, and still further objects of the present invention will become readily apparent to one skilled in the art from the following detailed description and drawing wherein the figure represents a flow diagram of a process used in the practice of the invention.

Broadly, our invention contemplates a precipitated alumina-silica cogel which contains from about 5.5 to 8.5 percent by weight silica which is prepared by simultaneously reacting an acid aluminum salt and alkali metal aluminate and an alkali metal silicate. The gel is recovered and processed to obtain catalysts and catalyst supports having desired physical and chemical properties.

More specifically, we have found that a co-precipitated alumina-silica gel which is particularly useful for the preparation of catalysts and catalyst supports may be obtained by the process outlined in the drawing and described as follows: As indicated in the drawing, a source of an acid aluminum salt, preferably an aluminum sulfate solution, a source of alkali metal aluminate, preferably sodium aluminate solution and a source of alkaline metal silicate, preferably sodium silicate solution, is continuously combined to obtain a silica-alumina co-gel reaction mixture.

The cogellation reaction is conducted in two stages: (1) An initial cogel is precipitated at a pH of about 7.5 to 8.5 and preferably about 8; and (2) The precipitated cogel is stabilized at a pH of about 9.6 to 10.3 and preferably about 10.

The desired reaction pH is maintained by controlling the flow rate of the aluminum sulfate, sodium aluminate and sodium silicate reactants. Furthermore, sufficient sodium silicate is added to impart a total silica ($SiO_2$) content of the finished precipitated cogel of from about 5.5 to 8.5 percent by weight $SiO_2$.

In a typical procedure, a reactor vessel of appropriate size is partially filled with a water "heel" which is heated to a temperature of about 110° F. A reaction run period is selected and the flow rates of the reactant required to maintain the desired pH is determined. Preferably at the start of the run aluminum sulfate is added to the water "heel" to obtain an initial mixture having a pH of about 3 to 3.5. The flow of sodium aluminate solution is started, and controlled to maintain a pH of about 7 to 8. At this point the flow of sodium silicate is started, and the pH is maintained at about 7.6 to 8.4 by minor changes of flow rates of the reactants. Once the reaction pH is stabilized at the desired range, the flows of the reactant streams are continued for the duration of the run, which is typically 1 to 2 hours.

After the reactants are combined to obtain a precipitated alumina-silica cogel having the desired silica content, the flows of aluminum sulfate and sodium silicate are stopped and additional sodium aluminate is added until the pH of the reaction mixture increases to about 9.6 to 10.3 and preferably about 10. At this point, the cogel preparation procedure is essentially complete, and as shown in the drawing the cogel is recovered, preferably by filtration, washed to remove salts, and formed into catalyst supports of desired size and shape.

The aluminum sulfate solution used in the preparation of the cogels, preferably has a concentration of from about 6 to 8 percent $Al_2O_3$ by weight. The sodium aluminate solution contains from about 18 to 21 percent by weight $Al_2O_3$, and the sodium silicate solution preferably has a concentration of from about 7.5 to 11.0 percent by weight $SiO_2$. The temperature of the reactants at the time they are combined to obtain the cogel is from about 38° to 49° C. and preferably on the order of 43° C. Furthermore, during the reaction the temperature of the overall reaction mixture is maintained at a level of from about 43° to 54° C.

Subsequent to recovering the alumina-silica cogel by filtration, the cogel is preferably washed with water to remove soluble salts. The washed cogel is then utilized in the preparation of desired catalysts and catalyst supports. Typically, the washed cogel is admixed with water to obtain a slurry which is then spray dried to obtain particles having a size range of from about 3 to 70 microns. Alternatively, the cogel may be combined with other catalytic ingredients such as crystalline zeolites (Types X, Y and ZSM), clays and aluminas. Furthermore, the cogels may be spray dried along with additional binders such as silica, silica-alumina and alumina hydrosols and hydrogel components.

It is also contemplated that the precipitated cogel subsequent to spray drying may be admixed with minor quantities of water and formed into particulate catalyst supports using well-known forming techniques such as pilling, extrusion, and granulation. These formed catalyst supports may have a particle size range of from about 1.0 to 5.0 mm.

The precipitated cogel contemplated herein possesses very desirable surface area, pore volume and pore volume distribution characteristics. Typically, when the precipitated cogels have been dried, i.e. heated to a temperature of about 500° to 600° C. for a period of about 30 to 60 minutes the surface area as determined by nitrogen absorption techniques in pores below 600 Å in diameter will range from about 350 to 450 m²/g. Furthermore, the total pore volume in pores up to 10,000 Å diameter of the precipitated cogels will range from about 1.0 to 1.50 cc/g as determined by nitrogen absorption and mercury measurements. The pore size distribution of the precipitated cogel will range from about 1.0 to 1.35 cc/g of the pore volume in pores below about 600 Å and in diameter, the pore volume in pores larger than 600 Å up to about 10,000 Å as determined by mercury porosimetry will be on the order of 0.25 to 0.60 cc/g. The average pore diameter (APD) will range from 30 to 155 Å as determined by nitrogen desorption and calculated in accordance with the formula:

$$APD = (4PV \times 10^4)/SA$$

where PV is pore volume (cc/g) in pores below 600 Å diameter and SA in surface area (m²/g) in pores below 600 Å diameter.

It is found that the alumina-silica cogels contemplated herein are particularly useful for the preparation of hydroprocessing catalysts which are obtained by combining the formed cogels with desired quantities of group VI and/or group VIII metals. Furthermore, the present cogels may be utilized as a catalytic or hydrocracking catalyst or a catalyst component particularly when combined with crystalline zeolite such as type X, type Y, and ZSM zeolites.

Having described the basic aspects of the present invention, the following examples are given to illustrate specific embodiments thereof.

EXAMPLE 1

An alumina-silica cogel of the present invention which contained 7.0 percent by weight silica ($SiO_2$) was prepared using the following procedure.

A reaction vessel was partially filled with 200 gallons of water which was heated to 110° F. A reaction run period of 50 minutes was selected. A sodium silicate solution which contained 80 lbs of 40° Be sodium silicate dissolved in 20 gal. water and a sodium aluminate solution which contained 20 percent by weight $Al_2O_3$ were prepared and heated to a temperature of 110° F. An aluminum sulfate solution containing 7 percent by weight $Al_2O_3$ was also prepared and heated to 110° F. The run was started by adding the aluminum sulfate solution at a rate of two and one-half gal./minute to the mixed water heel contained in the reaction vessel. After 1 minute the pH was determined to be 3 to 3.5. The flow of aluminum sulfate was then stopped and after a 5 minute hold time, the addition of the sodium aluminate was started at a rate of 2 gal/minute. After 10 seconds the addition of the aluminum sulfate solution at a rate of 2.5 gal/minute was resumed and by minor variations of the soiium aluminate flow rate, the pH of the overall reaction mixture was quickly stabilized at 8.0. At this point the sodium silicate flow was started at a rate of one-half gal/minute which was maintained for the duration of the run. After 50 minutes the addition of reactants was stopped and then the flow of sodium aluminate was restarted at a rate of about 1.5 gal/minute to increase pH of the reaction mixture to 10.0 within 10 to 20 minutes. This slow rate of addition of the reactants is required to allow for uniform dispersion of the silica. At this point the cogelled reaction mixture was filtered to recover the precipitated cogel.

EXAMPLE 2

A 100 lb sample of the wet filter cake cogel obtained in Example 1 was washed with 800 gallons of water to remove soluble salts. The washed cogel was then dried at a temperature of 120° C. for one hour.

EXAMPLE 3

A 300 lb sample of the washed cogel obtained in Example 2 was admixed with water to obtain a slurry which contained 18 percent by weight solids. This slurry was then spray dried at a temperature of about 240° F. (outlet) to obtain a spray dried cogel powder having a particle size ranging from about 3 to 65 microns. 50 lbs of the spray dried cogel was admixed with 45 lbs of water and the mixture was then extruded to obtain extrudates having a diameter of 1 mm and a length of about 4 mm. Samples of these extrudates were then dried at 120° C. for one hour and then calcined at temperatures between 535° C. and 1090° C. The physical property range of these extrudates was determined and found to be as set forth in the Table below:

TABLE

| Sample (#) | Calcin. Temp (°C.) | PV $N_2$ (cc/g) | PV Hg (cc/g) | SA $N_2$ (m²/g) |
|---|---|---|---|---|
| 1 | 535 | 1.35 | 1.8 | 400 |
| 2 | 700 | 1.05 | 1.50 | 350 |
| 3 | 800 | 1.10 | 1.45 | 310 |
| 4 | 1000 | 1.00 | 1.40 | 200 |
| 5 | 1090 | 0.90 | 1.3 | 150 |

The above examples indicate that valuable catalyst components and catalyst supports may be obtained using the teachings of the present invention.

We claim:

1. A method for preparing an alumina-silica cogel that contains from about 5 to 10 percent by weight silica which comprises:
   (a) simultaneously reacting aqueous solutions of an acid aluminum salt, an alkali metal aluminate, and an alkali metal silicate at a pH of from about 7.6 to 8.4 to obtain an initial cogel;

(b) reacting said initial cogel with additional alkali metal aluminate at a pH of from about 9.6 to 10.3 to obtain a stabilized cogel; and (c) recovering the stabilized cogel.

2. The method of claim 1 wherein said recovered stabilized cogel is washed to remove soluble salts.

3. The method of claim 1 wherein the recovered cogel is characterized by a surface area greater than 350 m²/g, a total pore volume of up to 1.8 cc/g, an average pore diameter of about 30 to 155 Å and a pore volume of from about 0.9 to 1.35 cc/g in pores below 600 Å diameter.

4. The method of claim 2 wherein the recovered cogel is spray dried.

5. The method of claim 4 wherein the spray dried cogel is formed into extrudates.

6. The method of claim 4 wherein the extrudates are calcined at temperatures of about 535° to 1090° C. to obtain extrudates having a mercury pore volume of 1.3 to 1.8 cc/g, a nitrogen pore volume of 0.9 to 1.3 cc/g, and a surface area of 150 to 400 m²/g.

* * * * *